US006012792A

United States Patent [19]

Sievert et al.

[11] Patent Number: 6,012,792

[45] Date of Patent: Jan. 11, 2000

[54] COPIER HAVING FULL COLOR HIGH SPEED INKJET PRINTER WITH TWO INTRA PAGE PRINTING SPEEDS FOR CONTROLLING INK DRYING TIME FOR IMAGES HAVING DENSELY INKED AREAS

[75] Inventors: Otto K Sievert, Encinitas; Patrick J Brennan, San Diego; Joseph P Milkovits, Escondido, all of Calif.

[73] Assignee: Hewlett-Packard Company, Palo Alto, Calif.

[21] Appl. No.: 08/901,464

[22] Filed: Jul. 28, 1997

[51] Int. Cl.[7] .................................................... H04N 1/034

[52] U.S. Cl. .................................... 347/3; 347/43; 347/5; 347/12

[58] Field of Search ................................ 347/3, 5, 9, 12, 347/37, 43, 102, 56, 39; 395/109

[56] References Cited

U.S. PATENT DOCUMENTS

| | | | |
|---|---|---|---|
| 4,723,129 | 2/1988 | Endo et al. | 347/56 |
| 4,864,328 | 9/1989 | Fischbeck | 346/140 |
| 5,455,610 | 10/1995 | Harrington | 347/43 |
| 5,469,196 | 11/1995 | Okazaki et al. | 347/8 |
| 5,477,246 | 12/1995 | Hirabayashi et al. | 347/12 |
| 5,489,926 | 2/1996 | Arbeiter | 347/16 |
| 5,527,121 | 6/1996 | Santon | 400/323 |
| 5,608,439 | 3/1997 | Arbeiter et al. | 347/102 |
| 5,771,338 | 6/1998 | Nhu | 395/109 |

FOREIGN PATENT DOCUMENTS

| | | |
|---|---|---|
| 0382023 | 8/1990 | European Pat. Off. . |
| 0665111 | 8/1995 | European Pat. Off. . |
| 0720914 | 7/1996 | European Pat. Off. . |
| 3412531 | 10/1985 | Germany . |
| 01275046 | 11/1989 | Japan . |
| 06015817 | 1/1994 | Japan . |
| 07040549 | 2/1995 | Japan . |

*Primary Examiner*—John Barlow
*Assistant Examiner*—Michael S Brooke
*Attorney, Agent, or Firm*—Jerry R. Potts

[57] ABSTRACT

A full color copier having an inkjet printer includes a controller and algorithm for switching automatically intra page between one of two independent high speed carriage velocities and between one of two independent pen firing frequencies for maximize throughput relative to low ink density and high ink density graphic images to improve print quality images having densely inked areas by substantially reducing ink pen starvation, droplet trajectory errors, and fuzzy text edges.

20 Claims, 7 Drawing Sheets

COPIER HAVING FULL COLOR HIGH SPEED INKJET PRINTER WITH TWO INTRA PAGE PRINTING SPEEDS FOR CONTROLLING INK DRYING TIME FOR IMAGES HAVING DENSELY INKED AREAS

TECHNICAL FIELD OF THE INVENTION

The present invention relates generally to copiers employing high speed inkjet printers. More particularly, the present invention relates to a method and apparatus for improving print quality images having densely inked areas by substantially reducing ink pen starvation, droplet trajectory errors, and fuzzy text edges.

BACKGROUND OF THE INVENTION

Inkjet printers are efficient, quiet and produce high quality print images in a relatively inexpensive manner when operated in low speed printing modes. Such quality is achieved by sweeping a large number of inkjet nozzles over a print medium and ejecting droplets of ink onto the medium in one or more matrix arrays of minute ink drop patterns. Such arrays are known as swaths and the individual ink droplets are defined as pixels. The quality of the print image is then determined by assuring that each ink droplet has a precise volume of ink that is applied to a specific location on the print medium without smearing.

While such low speed inkjet printers have been satisfactory for many applications, there has been a constant demand for higher speed printers that produce high quality full color images. Meeting the demand for higher throughput while producing high quality, high density images, however, has not been achieved easily. In this regard, in order to produce full vibrant colors on a print medium, large volumes of ink must be deposited in concentrated areas on the medium. Such deposits produce vibrant colors but also cause the print medium to buckle and curl, which in turn, greatly effects throughput and print quality as will be explained.

Buckling and curling are technical terms that describe the reaction of an absorbent material, such as bond paper, when a large volume of liquid is deposited in a concentrated area. Buckling which is a problem referred to as cockling, is the expansion of a paper surface upwardly as it absorbs the liquid solvent component of the ink, which is typically water. Curling, on the other hand, is the twisting of the plane of the paper as a result of one side of the paper being saturated with ink while the other side of the paper remains dry.

The effects of cockling and curling are significant. In this regard, in order for an ink droplet to be accurately placed at a specific location on the print medium, the outlet of the inkjet nozzle must be disposed in close proximity to the paper surface. Placement of the nozzle relative to the paper surface however, must be sufficiently spaced to ensure that buckling will not result in the paper surface making contact with the nozzle surface.

Spacing the nozzle too far from the paper surface however, has a detrimental effect. More specifically, although an inkjet process is extremely quiet, it is nevertheless a very violent process. In this regard, each nozzle in the inkjet print head has an inner chamber for receiving a precise volume of ink. The ink enters the chamber through an inlet under capillary action and is ejected from a nozzle outlet with an explosive force as the ink and its constituent solvent are heated rapidly by the application of electrical current to a firing resistor disposed within the chamber. The rapid evacuating of the colorant within the chamber has two effects. First, the ink exiting the chamber expands outwardly to form large and small puddles of ink on the receiving paper which result in fuzzy pixel edges if the nozzle is spaced too far from the paper surface. Second, the ink entering the chamber rushes in against the back fire of the evacuating ink to create a turbulent inflow causing the incoming ink to rise and fall within the chamber as it dissipates its kinetic energy. This firing process is then repeated at a very rapid rate or frequency in order to deposit the large volumes of ink in concentrated areas on the paper. Should the frequency of firing be too rapid there is an immediate image degradation effect as either ink pen starvation or non precise volumes of ink result. Moreover, puddles of ink may accumulate on the nozzle plate which in turn may cause undesired and unwanted droplet trajectory errors.

Several attempts have been made to solve the problems associated with cockling and curling. For example, one solution was to heat the print medium by flowing heated air over the wet ink surface of the medium. Another solution was to heat the print medium while the ink is being ejected onto the medium surface. Other solutions included multi-pass printing and delayed printing to provide greater periods of time for the deposited ink to dry without smearing. While many of these solutions have enjoyed a certain degree of success, with the continuing demand for higher throughput the prior art has not been entirely satisfactory.

One attempt at providing a satisfactory solution for printing high quality graphic images at a high throughput rate is disclosed in the Arbeiter et al. U.S. Pat. No. 5,608,439. The Arbeiter patent discloses a densitometer for adaptive control of ink drying time where a printer controller and an associated algorithm establishes a variable delay time between sweeps. In this regard, the algorithm determines the maximum density of ink to be deposited in a given swath to control the amount of delay time between sweeps. In this manner rather than having a fixed delay time between individual sweeps, a variable delay time is implemented. This technique improves print quality at the expense of throughput and requires large amounts of processor time. Moreover, the Arbeiter et al. patent does not address the problems associated with ink pen starvation.

While the utilization of a variable sweep delay time has been successful in many applications, it would be highly desirable to have a new and improved apparatus and method for improving full color print quality images having densely inked areas in a high speed single pass inkjet printer without inhibiting carriage movement between swaths while simultaneously substantially reducing ink pen starvation, droplet trajectory errors, and fuzzy text edges when printing in a graphic image mode.

SUMMARY OF THE INVENTION

A copier system according to one aspect of the present invention includes a scanner having an associated memory unit for scanning and storing document images that are transferred via an interface unit to a high speed Inkjet printer that switches printing speeds intra page from swath to swath depending upon ink density requirements for producing graphic and textual images in response to print commands from the scanner.

A full color copying system according to another aspect of the present invention includes a plurality of carriage mounted print head cartridges each having a plurality of inkjet nozzles for applying precise volumes of black and colorant ink droplets on a medium surface to form a full color high density graphic image without smearing and without inhibiting carriage travel between sweeps. The copying system includes a printer controller that responds to print commands of a scanner by printing intra page swaths of image information at different printing rates and at different nozzle firing rates, where the printing and firing rates for forming each swath is determined based upon the densities of the black and colorant ink droplets to be ejected by the nozzles in each individual swath.

Another aspect of the present invention is directed to a printing method for forming full color graphic images at a high throughput rate. The method comprises the steps of dividing a swath to be printed into a plurality of partitions, where each partition is a small matrix array of n columns by m rows of ink droplets and then determining for regions of overlapping partitions, the black droplet density and the color droplet density in each partition The precise volume of black droplets and colorant droplets in each given swath of the image to be formed is applied to the print medium at one of two independent rates. A first high speed rate and high speed firing rate is applied when the density of the black ink droplets in each of the regions of a given swath does not exceed a predetermined threshold level regardless of the colorant ink droplet density in the swath. A second high speed rate, is a high density graphics rate where the density of the black ink droplets in at least one of the regions in a given swath exceeds the predetermined threshold level, while the density of the colorant ink droplets in all the remaining regions of the given swath do not exceed the predetermined threshold level.

BRIEF DESCRIPTION OF THE DRAWINGS

The above mentioned features of this invention and the manner of attaining them will become apparent, and the invention itself will be best understood by reference to the following description of the embodiment of the invention in conjunction with the accompanying drawings, wherein.

DETAILED DESCRIPTION OF THE PREFERRED EMBODIMENT

Figure 1:
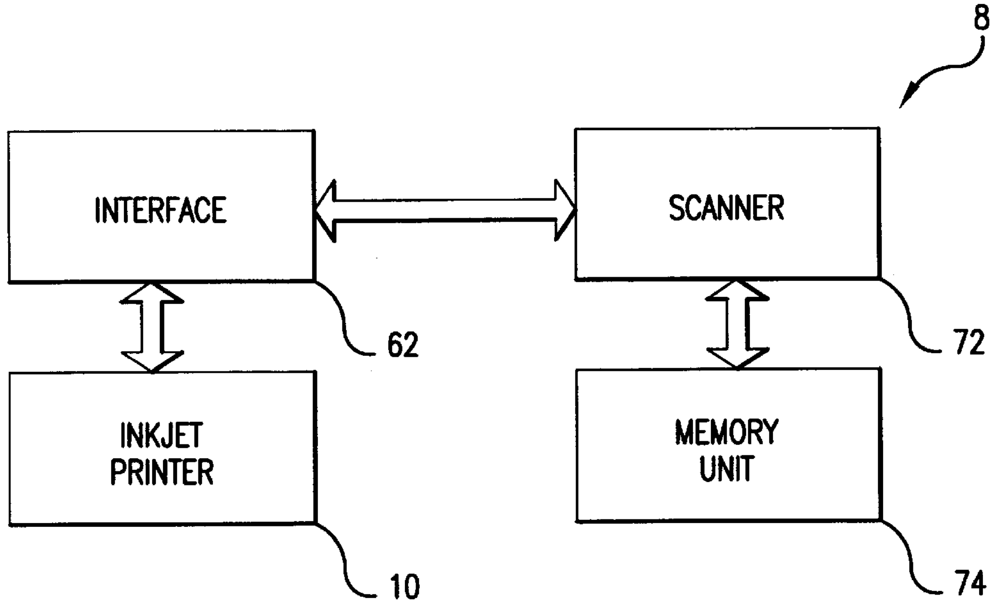
FIG. 1 is a block diagram of a copier which is constructed in accordance with the present invention.
Figure 2:
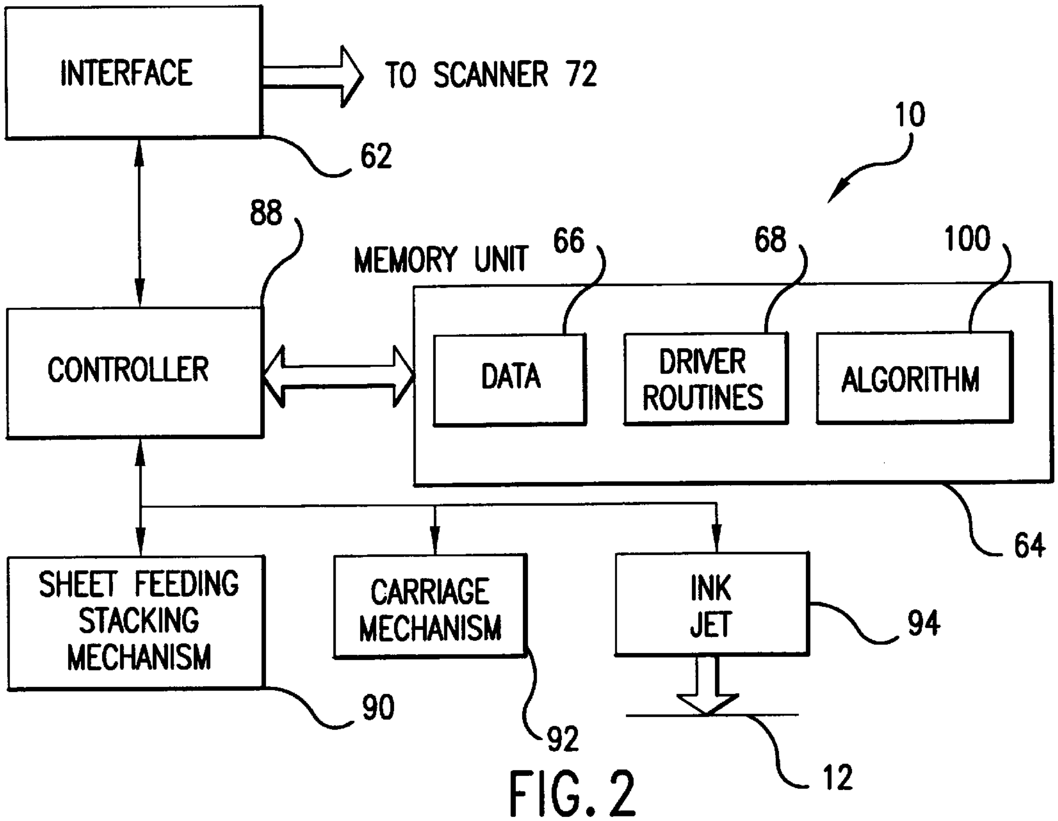
FIG. 2 is a block diagram of a high speed inkjet printer forming part of the copier of FIG. 1, illustrating the main hardware components of the printer.
Figure 3:
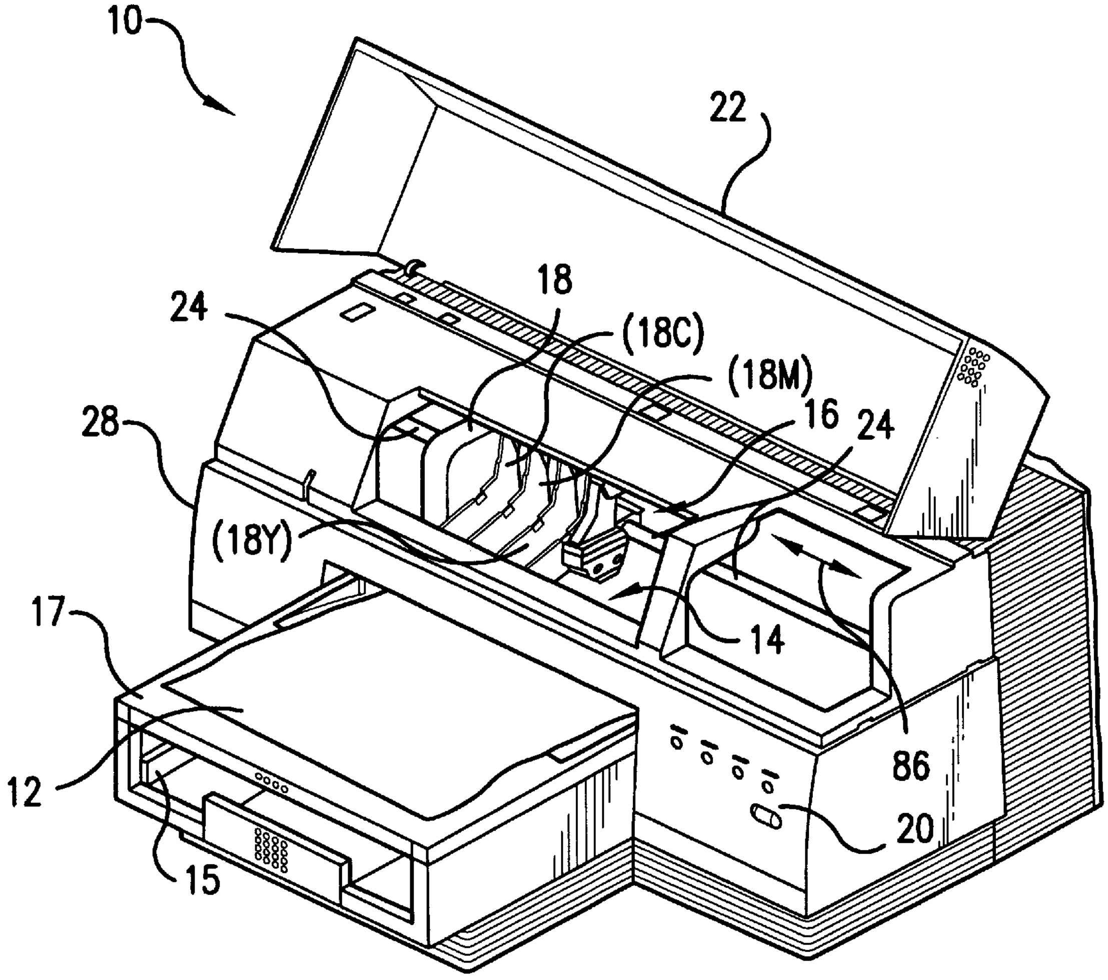
FIG. 3 is a fragmentary pictorial view of the copier of FIG. 1, illustrating its high speed inkjet printer.

Referring now to the drawings and more particularly to FIGS. 1–3 thereof, there is shown a full color copier 8 which is constructed in accordance with the present invention. The copier 8 utilizes a wet ink process for reproducing text and object images.

The copier 8 includes a scanner 72 having a memory unit 74 for scanning and storing document images to be printed. The combination of the scanner 72 and its associated memory unit 74 facilitates rapid reproduction of the document images to be printed as the document images to be printed need only to be scanned a single time.

In order to reproduce a hard copy of the document images stored in the memory unit 74, the copier 8 also includes a high speed, full color inkjet printer 10 that is coupled electrically to the scanner 72 via an interface unit 6. The inkjet printer 10, via the interface unit 62, responds to print commands from the scanner 72 to print various full color as well as black print images in the form of objects or textual information which have been stored temporarily in the memory unit 74 for copying purposes. FIG. 3 is a fragmentary perspective view showing an exemplary embodiment of the copier 8 illustrating the printer 10 portion with its housing 28 and control panel 20. The printer 10 is shown with its cover 22 in an open position to help illustrate various major mechanical components of the printing system.

Considering now the printer 10 in greater detail with reference to FIGS. 2–3, the printer 10 generally includes a print controller 88 having an associated memory unit 64. The print controller 88 responds to the print commands send by the scanner 72 by receiving and storing the document images to be printed in a data area 66 of the memory unit 64. The memory unit 64 also includes a driver routine area 68 for storing routines that control the mechanical apparatuses forming part of the printer 10. The mechanical apparatuses that form part of the printer 10, that will be described hereinafter in greater detail, include a sheet feeding and stacking mechanism 90, a carriage mechanism 92 for driving movably a carriage unit 16 having a set of stalls for receiving one or more print cartridges 18. Each print cartridge includes a plurality of inkjet nozzles, such as an inkjet nozzle 92. For clarity purposes FIG. 3 illustrates only one cartridge 18, with the remaining three stalls or bays being empty and marked with reference characters in parentheses thus: (18C), (18M), and (18Y) are the empty stalls for the cyan, magenta and yellow print cartridges.

In operation, the high speed inkjet printer 10 responds to commands from the scanner 72 by printing fill color or black print images on a sheet of paper 12 or other form of printing medium, such as a transparency which is retrieved mechanically from a medium supply tray 15 that holds a given amount of the printing medium. The given amount of printing medium that can be held by the supply tray 15 varies between a single sheet, such as the sheet 12, to a predetermined maximum quantity.

Figure 6:
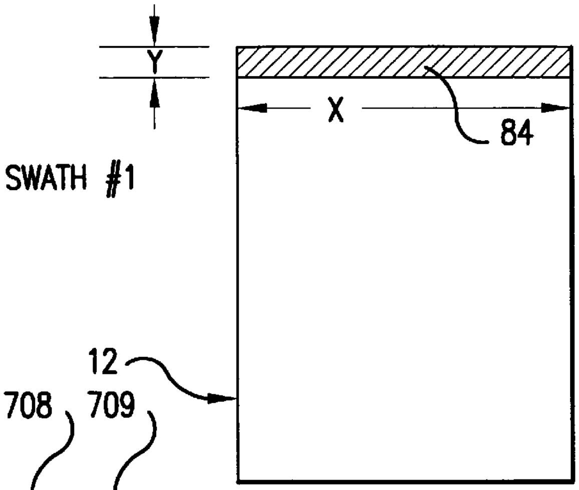
FIG. 6 is a plan view of a medium sheet illustrating diagrammatically a high density swath of ink droplets ejected thereon by the high speed inkjet printer of FIG. 3.

The printer 10 operates in a single pass printing mode to cause one or more swaths of ink droplets, such as a swath 84 (FIG. 6), to be ejected on to the printing medium 12 to form a desired image. The swath 84 is formed in a pattern of individual dots at particular locations of an array defined for the printing medium 12. The locations are conveniently visualized as being small dots in a matrix array. The locations of the individual ink droplets are known as "dot positions," or "pixels." The print carriage 16 having one or more print cartridges thereon, is supported from below on a slide rod 24 that permits the carriage 16 to move along a rectilinear path of travel whose direction is indicated generally at 86.

The path of travel followed by the print carriage 16 is traverse to the path of travel followed by the sheet 12 as it passes through a print zone 14. In this regard, when a print operation is initiated by the scanner 72, the controller 88 responds causing the sheet feeding stacking mechanism 90 to retrieve and move the sheet 12 from the supply tray 15 along a medium path of travel within the printer 10 into the print zone 14. When the sheet 12 reaches the print zone 14, the sheet 12 is stopped temporarily for printing purposes. When the sheet 12 stops in its path of travel, the carriage mechanism 92 causes the carriage 16 to scan across the sheet 12 allowing the print cartridges, such as the print cartridge 18 to eject drops of ink at appropriate times pursuant to the command of the print controller 88, wherein the timing of the application of the ink drops onto the sheet 12 corresponds to the pattern of pixels of the image being printed.

After the first swath 84 of ink droplets is deposited onto the sheet 12, a stepper motor in combination with a set of feed rollers (not shown) forming part of the sheet feeding stacking mechanism 90 cause the sheet 12 to be incrementally shifted or moved along its path of travel to a next printing position within the print zone 14. When the sheet 12 comes to rest at the next position in the print zone 14, the carriage 16 is scanned across the sheet 12 in an opposite direction along its path of travel for printing a next swath of ink. When the sheet 12 has been advanced through each of its printing positions in the print zone 14 so that printing of the desired information is completed, the sheet 12 is moved from the print zone to an output tray 17. In this manner, the smearing of wet ink on the sheet 12 is prevented.

Considering now the operation of the printer 10 in greater detail with reference to FIGS. 4–7, when the print head carriage 16 sweeps across the printing medium 12, the various ones of the ink jet nozzles on the print cartridges 18 eject ink to form a column of ink droplets whose height (x) is determined by the configuration and number of ink jet nozzles disposed on the print cartridge 18. In a 300 dot per inch print head, the height of the column is expressed as a function of the number of rows of dots, which in the preferred embodiment of the present invention is about N rows, where N is between about 104 and about 150. The width (y) of the column is determined by the length of the path of travel followed by the carriage as it travels across the paper medium 12. The resulting columns of ink droplets printed in one sweep of the carriage 16 across the medium 12 is commonly referred to a swath.

To print a given object or textual information on the medium 12, the scanner 72 scans a document to be copied and stores its textual and object images in the memory unit 74. Once the document images to be printed have been stored in the memory unit 74, the scanner 72 causes a print command to be sent to the printer 10. The object or textual information to be printed is also sent to the printer 10 and is stored in the data area 66 of the memory unit 64 as a plot profile file.

The controller 88 causes the received data to the stored in the form of plot profile files. The controller 88 while storing the received data utilizes a control algorithm 100 to determine the speed at which the object or textual information is to be printed. More particularly, the printer 10 has an optimum maximum printing speed wherein the carriage 16 travels along its rectilinear path of travel at a rate of about 1000 millimeters per second while firing the various inkjet nozzles at about a 12 Kilohertz rate. The carriage velocity and the firing rate of the inkjet nozzles determine the maximum throughput of the printer 10 when ink drop density on the medium is at a nominal level. However, when the ink drop density increases to a maximum level, the printer 10, under the control of the controller 88 and the algorithm 100, reduces its carriage velocity and nozzle firing rate intra page to allow sufficient time for the ink deposited onto the printing media 12 to dry. Stated otherwise, as will be explained hereinafter in greater detail, whenever the controller determines that ink drop densities have exceeded certain predetermined threshold levels in any given swath of information to be printed, the controller 88 causes that particular swath to be printed at a slower rate by reducing the velocity of the carriage unit 16 and by reducing the time between the firing of the nozzles.

Considering now the operation of the printer 10 in greater detail with reference to FIGS. 4–7, the printer 10 operates in two high density print modes. A first high density print mode has a carriage velocity of between about 1.0 meters per second and about 0.5 meters per second. A second high density print mode has a carriage velocity of between about 0.5 meters per second and about 0.25 meters per second. Under the control of the controller 88 and the associated control program 100, the printer 10 switches intra page on a swath by swath basis between these different high density printing modes depending upon the black ink droplet densities and the colorant ink droplet densities required by the individual ones of the swaths as will be explained hereinafter in greater detail.

Figure 7A:
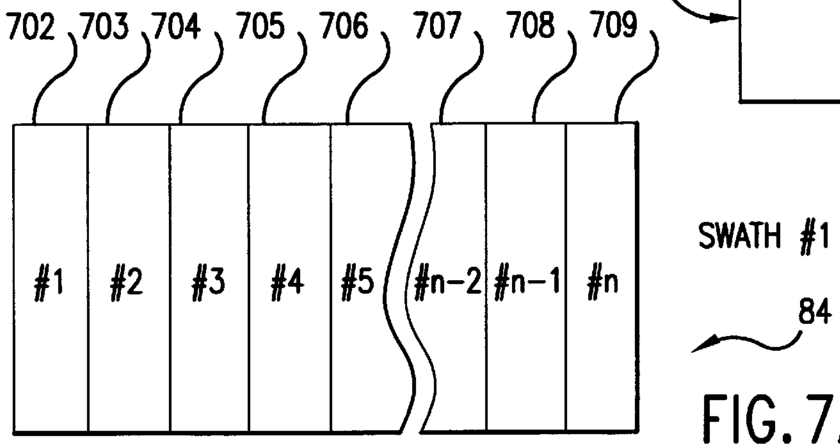
FIG. 7A is a diagrammatic view of a swath profile of the high density swath of FIG. 6, illustrating swath profile partitions.

In order to switch printing speeds from swath to swath on an intra page basis, the controller 88 operating under the commands of the algorithm 100, divides the image to be printed into one or more swaths and further divides each swath into a given number of partitions, such as an N number of partitions 702–709 as generally indicated in FIG. 7A. Each partition is n columns wide by m rows high.

Figure 7B:
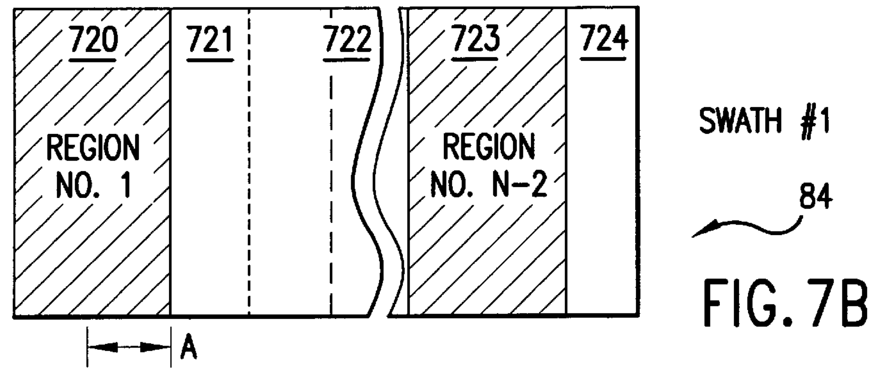
FIGS. 7B–C are diagrammatic views of the swath profile partitions of FIG. 7A segmented into a plurality of overlapping density regions.
Figure 7C:
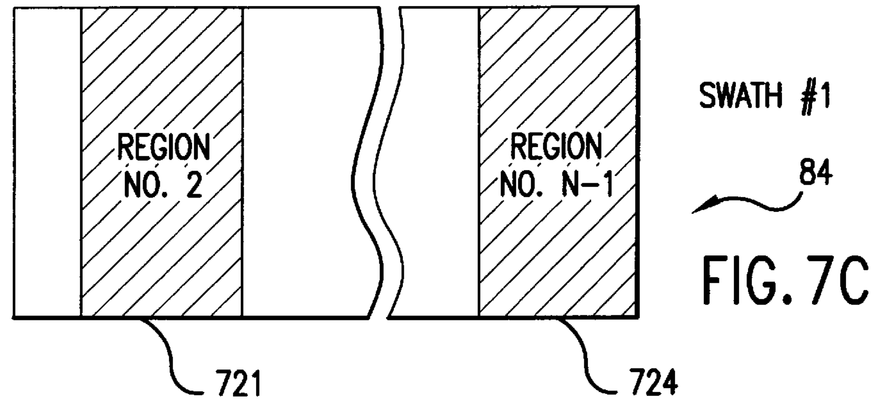

For facilitating density calculations, the partitions are arranged in regions, such as regions 720–724 where each region is composed of two overlapping partitions **2*n* columns wide and m rows high. For example, as best seen in FIGS. 7B–C, the first and second regions 720 and 721 in swath 84 have a common overlapping area occupied by partition 703** whose relative location is indicated generally at A.

The value of n ranges between 16 columns and 512 columns. A more preferred range of n is between 32 columns and 256 columns and the most preferred value for n is 128 columns. The value of m ranges between 2 rows and 128 rows. A more preferred range of m is between 4 rows and 64 rows, and the most preferred value for n is 32 rows.

As will be explained hereinafter in greater detail, a density subroutine 200 determines the black dot density and the combined color dot density in each partition of each swath. The black dot density is computed utilizing equation 1:

$$\text{Kdens} = \frac{\text{Number of Black pixels in partition}}{\text{Possible Number of Black pixels in partition}} \qquad \text{Eq. No. 1}$$

where the number of Kdens is: 0<=Kdens<=1.0 and where the black dot density range is (0% <=Kdens <=100%)

The combined color dot density is computed utilizing equation 2:

$$\text{Cdens} = \frac{\text{Number of (C pixels+M pixels+Y pixels) in partition}}{\text{Possible Number of Color pixels in partition}} \qquad \text{Eq. No. 2}$$

where the number of Cdens is: 0<=Cdens<=3.0 and where the color dot density range is (0%<=Cdens <=300%)

The control or density algorithm 200 then analyzes the black and combined color dot densities within the rows to be printed and in overlapping regions having a width of 2n columns to establish the printing speed for each individual swath in the image to be printed so that the print sweep velocity is reduced when the black dot density in one or more regions of a given swath exceeds a fixed threshold density level and the color dot density level within all the other regions in the given swath are below the fixed threshold level. Table No. 1 is a look up table the controller 88 utilizes in determining whether to advance the carriage 16 at its high speed textual rate or at its lower high speed object or image rate.

TABLE NO. 1

Retardation Algorithm Threshold Values

| Threshold Value | Preferred Value Range | More Preferred Value Range | Most Preferred Value Range |
|---|---|---|---|
| Black Only | 20%–100% | 40%–90% | 60% |
| Black/Color | 20%–100% | 40%–90% | 70% |
| Color | 0%–300% | 30%–200% | 70% |
| Color Hue | 0%–100% | 20%–100% | 50% |

To illustrate for example the application of Table No. 1, when the black dot density is less than 60%, the controller 88 causes the carriage 16 to sweep at its high speed textual rate of about 0.25 seconds per sweep with a pen firing rate of about 12 Kilo hertz and at about 0.50 seconds per sweep with a pen firing rate of about 6 Kilo hertz when the black dot density is equal to or greater than 60%.

From the foregoing, it should be understood by those skilled in the art that the algorithm 100 examines color density as a factor because a sweep velocity reduction may cause a color hue shift, which in turn, will effect print quality. Therefore, color hue shift is minimized in regions where color and black are mixed. In short, print speed reduction is avoided when a sweep contains sufficiently dense color in regions with low black dot density.

Figure 4A:
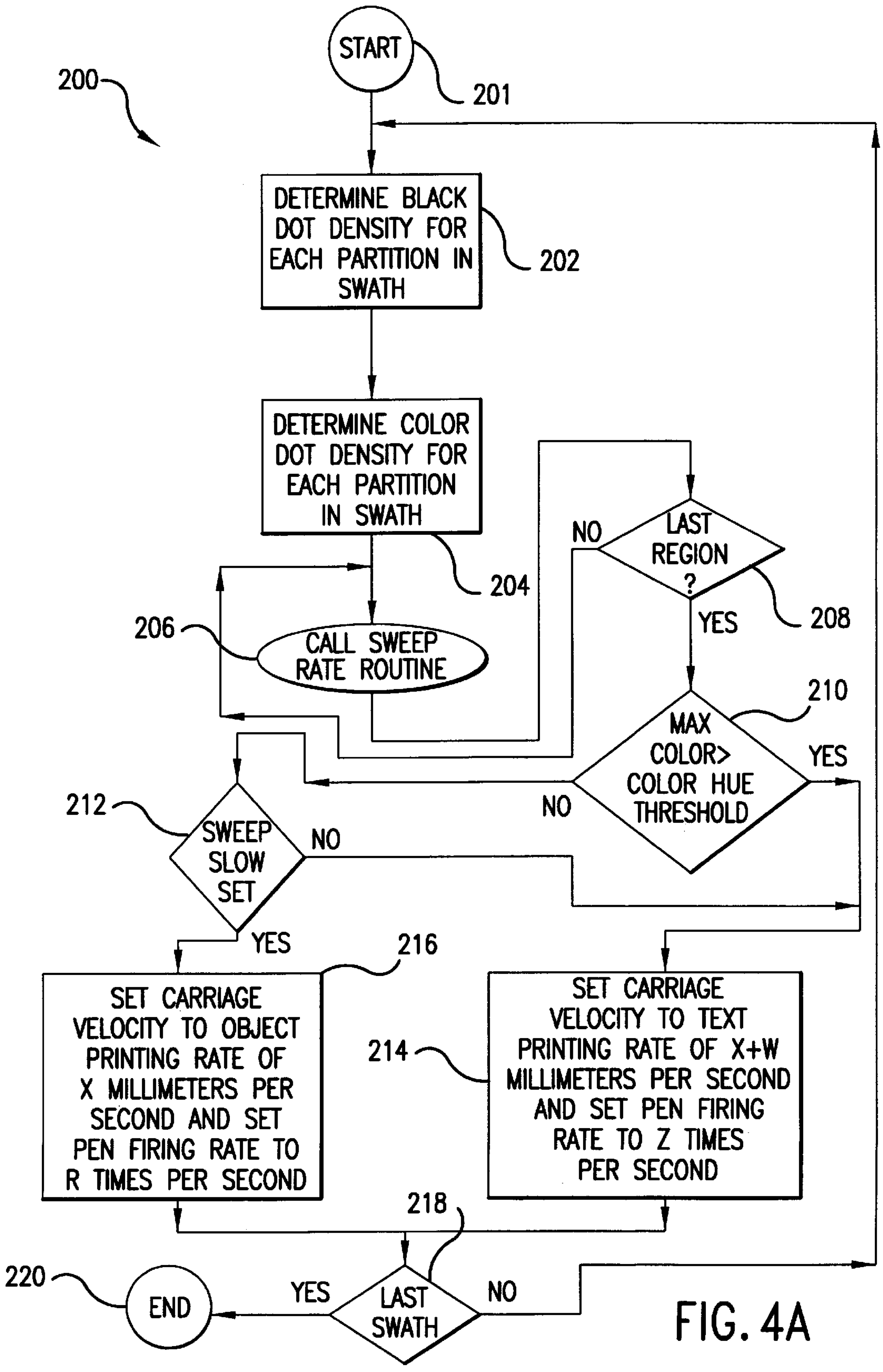
FIG. 4 is a flow chart showing the steps performed by the print controller of FIG. 2 in printing a swath of information on a printing media.
Figure 4B:
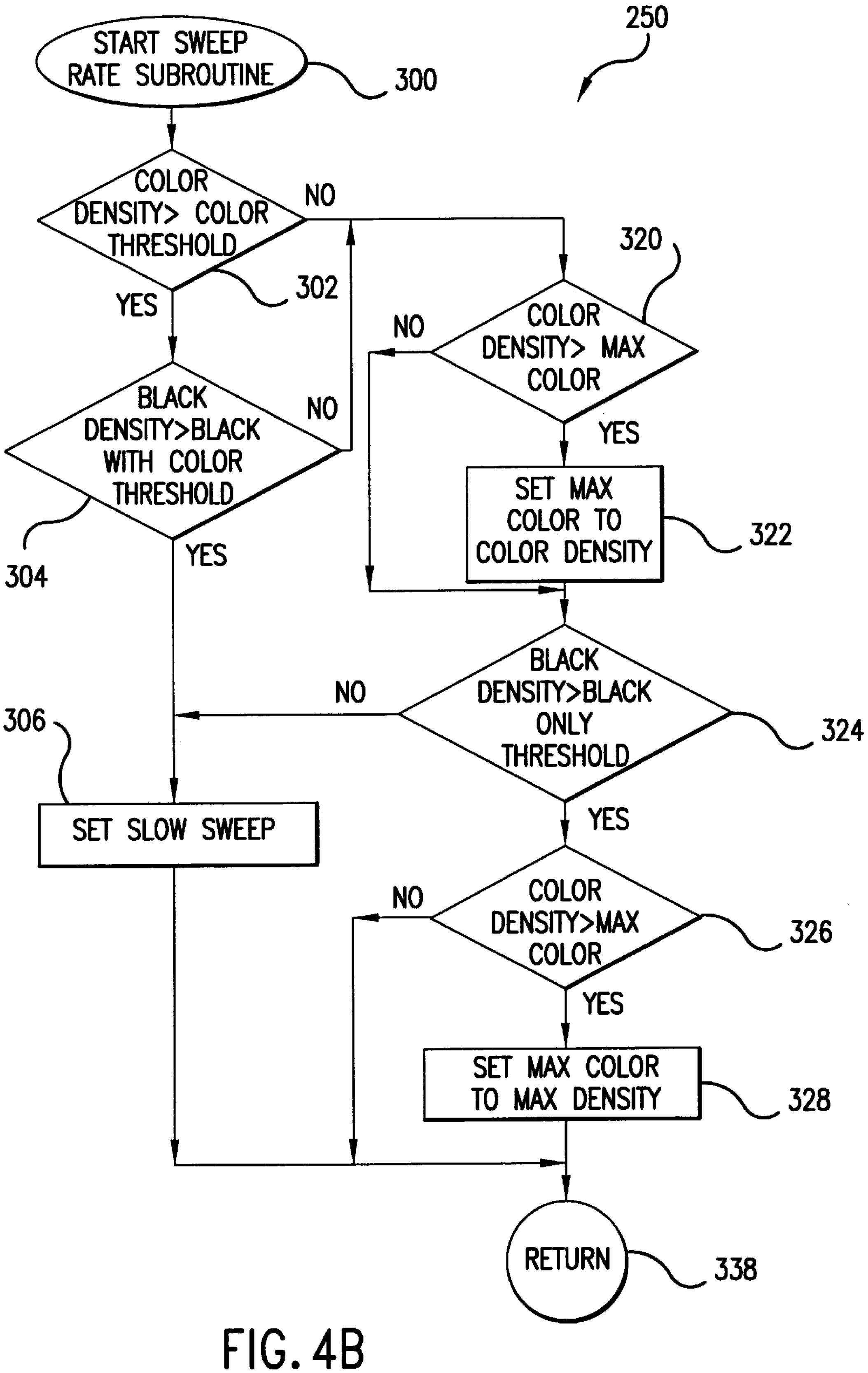
Figure 5:
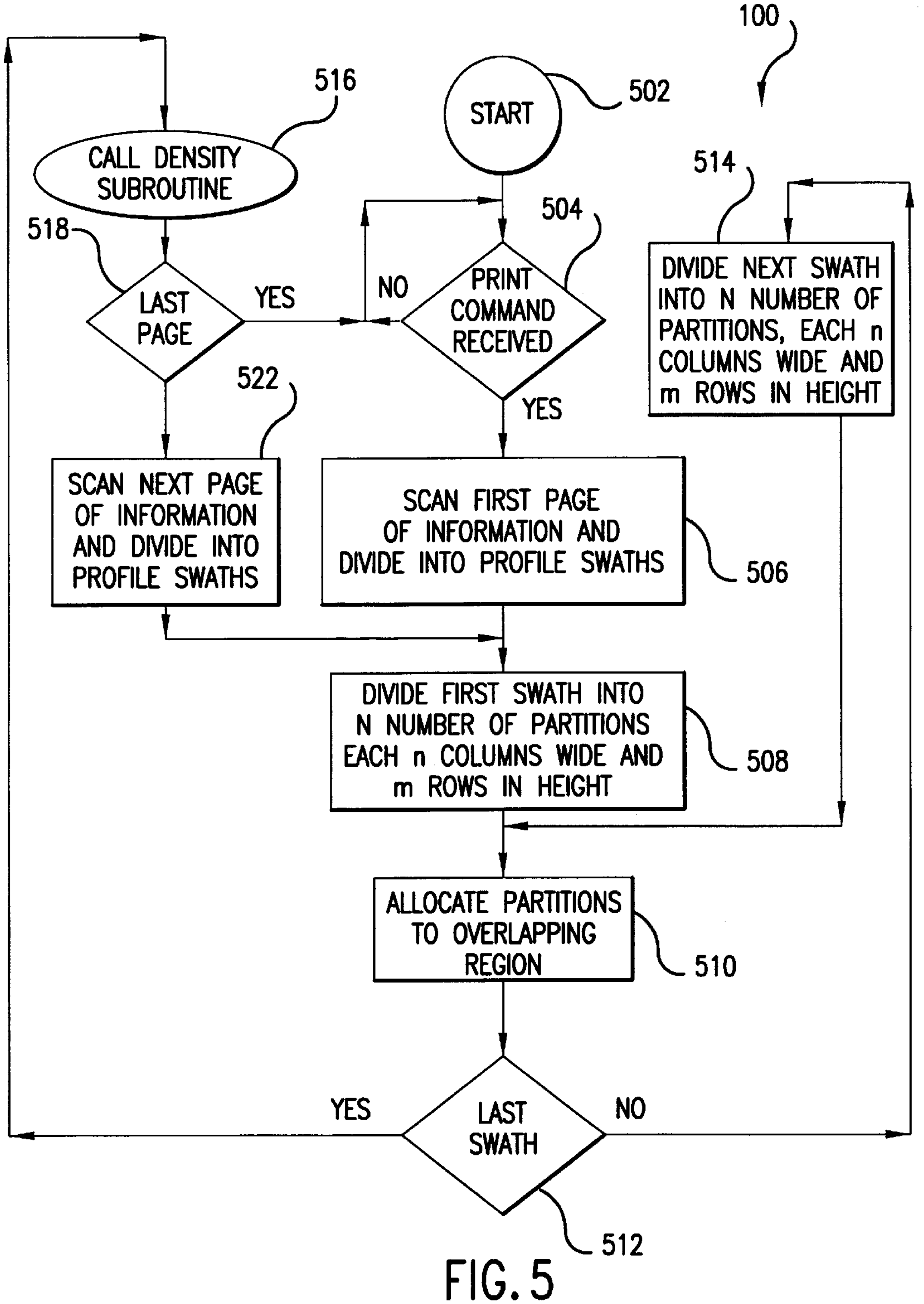
FIG. 5 is a flowchart showing the steps performed by the print controller of FIG. 2 when executing a density calculation subroutine.

Considering now the steps performed by the controller 88 carrying out the algorithm 100 with reference to FIGS. 4–5, in this exemplary embodiment the controller 88 begins the algorithm 100 at a start command step 502 when power is applied to the controller 88. The controller 88 then enters an idle mode at a decision step 504 waiting for the scanner 72 to send a print command.

When the scanner 72 initiates a print command, the printer control program 100 advances to a command step 506 and reads the first page of information to be printed dividing the information into a series of profile or swath files. In step 508 the control program causes the controller 88 to divide the first swath, such as the swath 84, into N number of partitions, where each partition is n columns wide and m rows in height.

Next at a command step 510 the control program causes the controller 88 to allocate the partitions, such as the partitions 702–709 into a plurality of overlapping regions, where each region comprises twice the number of columns in any given partition. The control program 100 then steps to a decision command 512 to determine whether the partitioned swath was the last swath relative to the total number of swaths on the page of information to be printed.

If the swath was not the last swath to be printed, the control program 100 advances to a command step 514 that causes the next swath to be divided into N number of partitions in the same manner as described previously. Once the next swath has been partition, the controller 88 steps to the allocation step 510 and proceeds as described previously.

If the swath was the last swath to be printed, the control program 100 advances to a call command that calls a DENSITY CALCULATION subroutine 200 that will be described hereinafter in greater detail. After the DENSITY CALCULATION subroutine 200 is executed, the control program advances to a decision command 518 to determine whether the page of information printed was the last page of information associated with the print command sent by the scanner 72. In this regard, if there are no more pages of information to be printed, the control program proceeds to the idle mode at the decision command 504 to wait for another print command from the scanner 72.

In step 518 if it is determined that additional pages of information need to be printed, the control program goes to a read command step 522 and causes the next page of information to be retrieved from the memory unit 64 and divides it into one or more profile swath files. The control program 100 then returns to the command step 508 and proceeds as described previously.

Considering now the DENSITY CALCULATION subroutine 200 in greater detail with reference to FIG. 4, from the call command step 516 the control program 100 proceeds to subroutine 200 at a start step 201 and immediately advances to a command step 202 to determine the black dot density for each partition in a current swath, such as the swath 84. Next the control program advances to another command step 204 to determine the color dot density for each partition in the current swath.

After the black and color dot densities have been determined, the subroutine 200 advances to a call step 206 that causes a SWEEP RATE subroutine 250 to be executed. The SWEEP RATE subroutine 250 will be described hereinafter in greater detail. The SWEEP RATE subroutine 250 helps facilitating establishing the velocity rate of the carriage 16 and the time delay between the firing of the print cartridges 18 and their associated nozzles.

After the SWEEP RATE subroutine 250 is executed, subroutine control returns to a decision step 208 to determine whether the last region has been analyzed. If the last region has not been analyzed the program goes to the call step 206 and proceeds as described previously. If the last region was analyzed the program goes to a decision step 210 that determines whether the maximum color is greater than the color hue threshold level for the given sweep. If the maximum color is greater than the color hue threshold level, the program proceeds to a command step 214 that set the carriage velocity to a maximum printing rate of x+w millimeters per second and sets the pen firing rate to a maximum pen firing rate of Z times per second.

If at step 210 it is determined that the maximum color is not greater than the color hue threshold level, the program proceeds to a decision step 212 that determines whether the slow sweep flag has been set when the program executed the SWEEP RATE subroutine 250 as will be described hereinafter in greater detail.

If at step 212 it is determined that the slow sweep flag has not been set, the program goes to the command step 214 and proceeds as described previously. If at step 212 it is determined that the slow sweep flag was set, the program advances to a command step 216 that causes the carriage velocity to be set to the slow rate of x millimeters per second and the pen firing rate set to a slow firing rate of R times per second.

After the either of the command steps 214 and 216 have been executed, the program advances to a decision step 218 to determine whether all of the sweeps on the first page of information to be printed have been analyzed. If all of the swaths have not been analyzed, the program goes to the command step 202 and proceeds as described previously. If the last swath has been analyzed, the program goes to an end step 220 that causes the program to return to step 518 as best seen in FIG. 5.

In the preferred embodiment of the present invention, the maximum velocity of x+w millimeters per second is only limited by the maximum velocity that the carriage can travel. This maximum velocity is about 1250 millimeters per second. A more preferred maximum velocity is about 1125 millimeters per second, and the most preferred maximum velocity is about 1000 millimeters per second. The delay time between pen firings is set to about 12 Khz rate at step 214.

In the preferred embodiment of the present invention, the delay times of Z and R are substantially different from one another. In this regard, the delay time Z is at about a 6.0 Kilohertz rate while the delay time R is at about a 12 Kilohertz rate. The delay times of Z and R should not be confused with the firing cycle time of the print head cartridge which is fixed at about 2 microseconds regardless of the delay times between pen firings.

Considering now the SWEEP RATE subroutine 250 in greater detail with reference to FIG. 4, the SWEEP RATE subroutine is accessed from the call command step 206 and begins at a start command 300. The subroutine then continues to a decision step 302 that determines whether the color density level in the current region is greater than the color density threshold level. If the color density is greater than the color threshold level, the subroutine advances to another decision step 304 to determine whether the black dot density of the current region is greater than the black with color threshold level. At step 302 if a determination is made that the color density is not greater than the color threshold level, the subroutine 250 proceeds to a decision step 320.

Considering again the step 304, if at step 304 a determination is made that the black dot density is not greater than the black with color threshold level, the subroutine advances to the determination step 320 that will be described hereinafter.

If at step 304 a determination is made that the black density is greater than the black with color threshold level, the subroutine proceeds to the command step 306 and sets a SLOW SWEEP condition flag that will be utilized subsequently to determine whether a fast or slow sweep rate will be applied to the current swath under analysis as will be described in greater detail.

After the subroutine determines at step 302 that the color density of the current region is not greater than the color threshold level, the subroutine 250 advances to the decision step 320 as mentioned previously. At step 320 a determination is made regarding whether the color density of the current region is greater than a maximum color density level. If this condition is true, the subroutine goes to a command instruction step 322 that causes a condition flag to be set to indicate that maximum color is the color density. From step 322, the subroutine advances to a decision step 324 that will be described.

If the condition in step 320 is not true, the subroutine advance directly to the decision step 324, where a determination is made whether the black dot density in the current region is greater than the black only threshold level. If the black dot density in the current region is not greater than the black only threshold level, the subroutine advances to the command step 306 and sets the SLOW SWEEP condition. After the SLOW SWEEP condition is set at step 306, the subroutine goes to a RETURN step 338 that returns the program to step 208 to examine another region in the swath.

Considering again the decision step 324, if the black dot density in the current region is greater than the black only threshold level, the subroutine proceed to a determination step 326 that determines whether the color dot density in the current region is greater than the maximum color level.

In decision step 326 if a determination is made that the color dot density is not greater than the maximum color level, the subroutine goes to the return step 338 that returns the program to step 208 as described previously. Otherwise, the next step is a command step 328 where the controller 88 sets a flag to indicate that maximum color is maximum density. After executing the command step 328 the program advances to the return step 338 and proceeds as described previously.

From the foregoing it should be understood by those skilled in the art that the printer 10 operates in two high speed intra page printing modes that switch from one to another under the control of the controller 88 depending upon the ink drop density from swath to swath. The high speed high density rate is about one half the high speed low density rate relative to both the carriage velocity and the firing frequency rate of the individual nozzles.

It should also be understood by those skilled in the art that although the firing frequency of the individual nozzles is changed from one frequency to another frequency, the firing time of the individual nozzles is not changed but remains constant at both the high speed high density rate and the high speed low density rate. In this manner, the large volumes of ink that must be ejected in the high speed high density are precisely measured giving each nozzle an adequate period of time to refill and settle from a previous firing. Thus, not only is ink pen starvation is avoided but such additional time allocations between pen firing cycles helps reduce droplet trajectory errors, and significantly improves image quality by substantially reducing fuzzy text edges.

Figure 8:
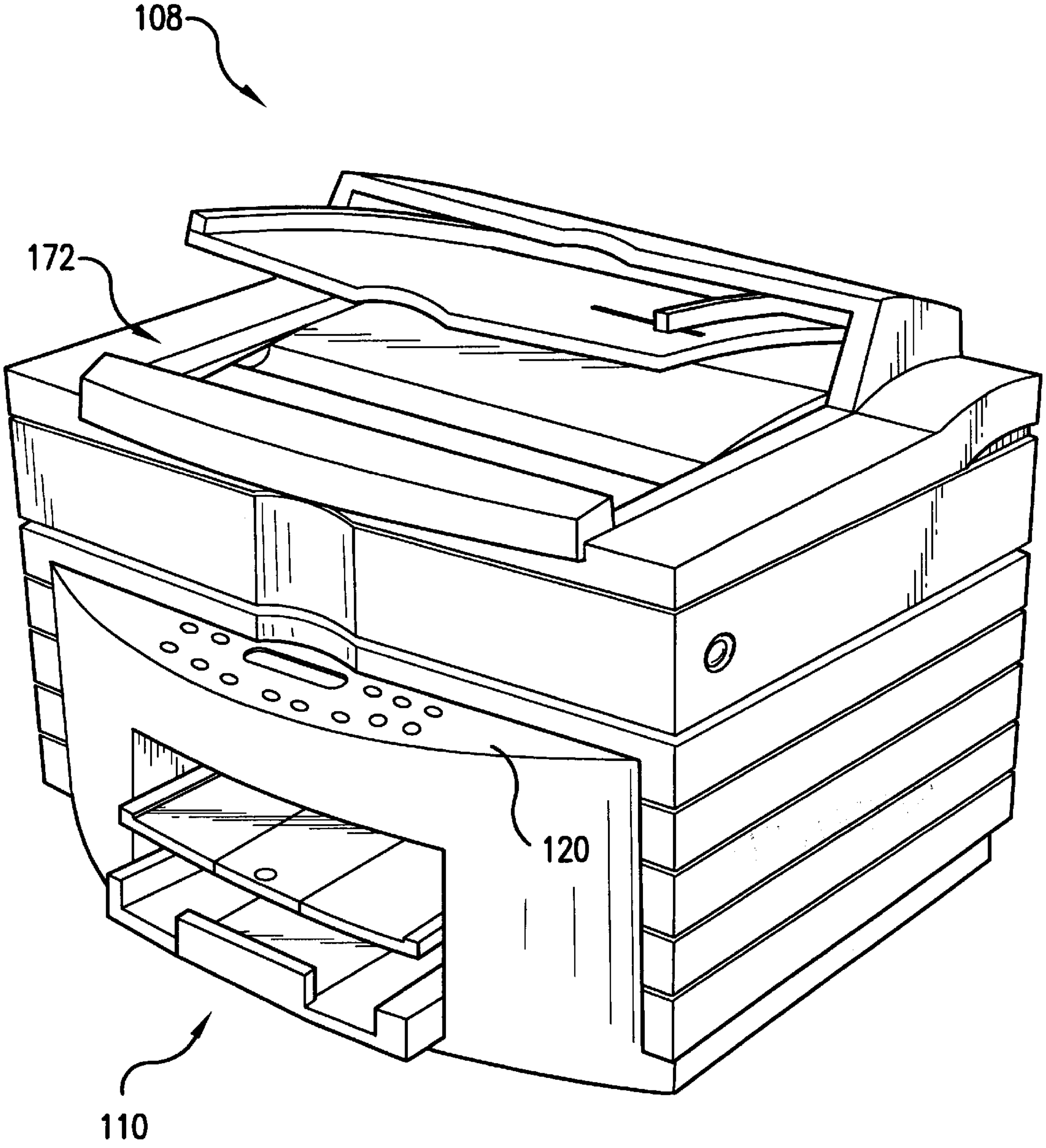
FIG. 8 is a perspective view of another full color copier which is constructed in accordance with the present invention.

Referring now to the drawings and more particularly to FIG. 8, there is shown an full color copier 108 which is constructed in accordance with the present invention. The copier 108 is substantially similar to the copier 8 and includes a printer 10 and a scanner 172 having a control panel 120. As best seen in FIG. 8, the only difference between the copier 8 and the copier 108 is the physical configuration of the control panel 120 and the physical arrangement of the printer 110 and the scanner 172.

While a particular embodiment of the present invention has been disclosed, it is to be understood that various different modifications are possible and are contemplated within the true spirit and scope of the appended claims. For example, in the preferred embodiment of the present invention the width of each partition in a given swath is greater in dimension than the number of rows in each partition. It is contemplated that the width of each partition in a given swath may be substantially less or equal in dimension to the number of rows in each partition. There is no intention, therefore, of limitations to the exact abstract or disclosure herein presented.

We claim:

1. An an inkjet printer having a carriage unit with at least one print head mounted thereon for printing on a sheet of print media at least one copy of a scanned document image, the copy of the scanned document image being formed by a plurality of swaths;

wherein certain individual ones of said plurality of swaths are monochromatic formed of black ink droplets only or single colorant ink droplets only distributed in various swath densities on the print media;

wherein certain other individual ones of said plurality swaths are polychromatic formed of both black ink droplets and colorant ink drops or multiple colorant ink drops distributed in various swath densities on the print media said inkjet printer, comprising:

velocity control means coupled to the carriage unit for causing the carriage unit to advance along a rectilinear path of travel at one of two different velocities during the formation of the individual ones of said plurality of swaths forming the copy of the scanned document image;

one of said velocities being a first high speed velocity for facilitating the printing an individual one of the swaths having a black ink droplet density exceeding a given threshold level in at least one region of said individual swath and a colorant ink droplet density not exceeding said given threshold level in all the remaining regions of said individual swath;

another one of said velocities being a second high speed velocity for facilitating the printing another individual one of the swaths having a colorant ink droplet density exceeding said given threshold level in at least one region of said another swath regardless of the black ink droplet density in said another swath.

2. An inkjet printer according to claim 1, further comprising:

firing rate control means for causing said print head to eject black ink droplets and colorant ink drops at one of two different rates during the formation of individual ones of the plurality of swaths forming the image;

one of said rates being a first firing rate for facilitating the printing of each individual one of the swaths having a black ink droplet density exceeding said given threshold level in at least one region of the swath and a colorant ink droplet density not exceeding said given threshold level in all the remaining regions of the swath;

another one of said rates being a second firing rate for facilitating the printing of each individual one of the swaths having a colorant ink droplet density exceeding said given threshold level in at least one region of the swath regardless of the black ink droplet density in said swath.

3. A full color copier including an inkjet printer having a carriage unit for moving along a rectilinear path of travel, the carriage unit having at least one print head for forming object and textual image information in a plurality of swaths of blank ink droplets and colorant ink droplets distributed in various swath densities on a print medium, comprising:

velocity control means coupled to the carriage unit for causing the carriage unit to advance along the rectilinear path of travel at one of two different velocities during the formation of individual ones of the plurality of swaths forming the image;

one of said velocities being a first high speed velocity for facilitating the printing of an individual one of the swaths having a black ink droplet density exceeding a given threshold level in at least one region of said individual swath and a colorant ink droplet density not exceeding said given threshold level in all the remaining regions of said individual swath;

another one of said velocities being a second high speed velocity for facilitating the printing of another individual one of the swaths having a colorant ink droplet density exceeding said given threshold level in at least one region of said another swath regardless of the blank ink droplet density in said another swath.

4. A copier according to claim 3, wherein said first high speed velocity is about 1.50 meters per second, and wherein said second high speed velocity is about 0.75 meters per second.

5. A copier according to claim 4, wherein a more preferred first high speed velocity is between about 1.25 meters per second and about 1.00 meters per second.

6. A copier according to claim 5, wherein a most preferred first high speed velocity is about 1.00 meters per second.

7. A copier according to claim 3, wherein said second high speed velocity is between about 0.25 meters per second and about 0.75 meters per second.

8. A copier according to claim 7, wherein a more preferred second high speed velocity is between about 0.35 meters per second and about 0.65 meters per second.

9. A copier according to claim 8, wherein a most preferred second high speed velocity is about 0.50 meters per second.

10. A copier according to claim 3, further comprising:

firing rate control means for causing said print head to eject black ink droplets and colorant ink drops at one of two different rates during the formation of individual ones of the plurality of swaths forming the image;

one of said rates being a first firing rate for facilitating the printing of each individual one of the swaths having a black ink droplet density exceeding said given threshold level in at least one region of the swath and a colorant ink droplet density not exceeding said given threshold level in all the remaining regions of the swath;

another one of said rates being a second firing rate for facilitating the printing of each individual one of the swaths having a colorant ink droplet density exceeding said given threshold level in at least one region of the swath regardless of the black ink droplet density in said swath.

11. A copier according to claim 10, wherein said first firing rate is between about 10,000 ejections per second and about 100000 ejections per second.

12. A copier according to claim 11, wherein a more preferred first firing rate is between about 6000 ejections per second and about 12000 ejections per second respectively.

13. An inkjet printer according to claim 12, wherein a most preferred first firing rate is about 60000 ejections per second.

14. A method of printing a color image on a sheet of print media, the image being formed by a plurality of swaths of black ink droplets and colorant ink droplets distributed in various swath densities on the print media, comprising:

ejecting the black ink droplets and the colorant ink droplets onto the print media in the various swath densities;

moving said print head traversely to the print media along a rectilinear path of travel so that the plurality of swaths of black ink droplets and the colorant ink droplets ejected by said print head form the image as the sheet of print media moves traversely to said print head along another rectilinear path of travel;

advancing the print head along said rectilinear path of travel at one of two different velocities during the formation of the individual ones of the plurality of swaths forming the image;

one of said velocities being a first high speed velocity for facilitating the printing of each individual one of the swaths having a black ink droplet density exceeding a given threshold level in at least one region of the swath and a colorant ink droplet density not exceeding said given threshold level in all the remaining regions of the swath;

another one of said velocities being a second high speed velocity for facilitating the printing of each individual one of the swaths having a colorant ink droplet density exceeding said given threshold level in at least one region of the swath regardless of the black ink droplet density in said swath.

15. A printing method according to claim 14, further comprising:

ejecting black ink droplets and colorant ink drops at one of two different rates during the formation of individual ones of the plurality of swaths forming the image;

one of said rates being a first firing rate for facilitating the printing of each individual one of the swaths having a black ink droplet density exceeding said given threshold level in at least one region of the swath and a colorant ink droplet density not exceeding said given threshold level in all the remaining regions of the swath;

another one of said rates being a second firing rate for facilitating the printing of each individual one of the swaths having a colorant ink droplet density exceeding said given threshold level in at least one region of the swath regardless of the black ink droplet density in said swath.

16. An inkjet printer having a carriage unit with at least one print cartridges for ejecting ink onto a medium to form an image, the image being formed by a plurality of swaths of black ink droplets and colorant ink droplets distributed in various ink droplet densities on the print medium, comprising:

a controller responsive to a computer print command for causing said controller to control the intra page traveling velocity of the carriage unit as it traverses along a rectilinear path of travel substantially perpendicular to another path of travel followed by the medium as it travels through a print zone in the printer;

said carriage unit having two independent high speed intra page traveling velocities, wherein one velocities is a maximum throughput velocity for low density image information, and the other one of the velocities is a maximum throughput velocity for high density image information; and said controller being further responsive to said computer print command for causing said controller to determine which one of the two independent high speed intra page traveling velocities will be applied to the carriage unit to control its intra page traveling velocities as it traverses along its rectilinear path of travel relative to each swath of image information.

17. An ink jet printer according to claim 16, wherein one of said velocities is a first high speed velocity for facilitating the printing of each individual one of the swaths having a black ink droplet density exceeding a given threshold level in at least one region of the swath and a colorant ink droplet density not exceeding said given threshold level in all the remaining regions of the swath; and wherein another one of said velocities being a second high speed velocity for facilitating the printing of each individual one of the swaths having a colorant ink droplet density exceeding said given threshold level in at least one region of the swath regardless of the black ink droplet density in said swath.

18. An inkjet printer according to claim 17, wherein said controller is further responsive to said computer print command for causing said controller to determine which one of two independent pen firing frequency rates will be applied to the print head for ejecting black ink droplets and colorant ink drops onto the medium during the formation of the individual ones of the swaths forming the image;

one of said fire frequency rates being a first firing rate for facilitating the printing of each individual one of the swaths having a black ink droplet density exceeding said given threshold level in at least one region of the swath and a colorant ink droplet density not exceeding said given threshold level in all the remaining regions of the swath;

another one of said fire frequency rates being a second firing rate for facilitating the printing of each individual one of the swaths having a colorant ink droplet density exceeding said given threshold level in at least one region of the swath regardless of the black ink droplet density in said swath.

19. An inkjet printer having a carriage unit with at least one print head mounted thereon for printing on a sheet of print media at least one copy of a scanned document image, the copy of the scanned document image being formed by a plurality of swaths;

wherein certain individual ones of said plurality of swaths are monochromatic formed of blank ink droplets only or single colorant ink droplets only distributed in various swath densities on the print media;

wherein certain other individual ones of said plurality swaths are plurality formed of both black ink droplets and colorant inkjet printer, comprising:

firing rate control means for causing said print head to eject black ink droplets and colorant ink drops at one of two different rates during the formation of individual ones of the plurality of swaths forming the image;

one of said rates being a first firing rate for facilitating the printing of each individual one of the swaths having a black ink droplet density exceeding said given threshold level in at least one region of the swath and a colorant ink droplet density not exceeding said given threshold level in all the remaining regions of the swath; and another one of said rates being a second firing rate for facilitating the printing of each individual one of the swaths having a colorant ink droplet density exceeding said given threshold level in at least one region of the swath regardless of the black ink droplet density in said swath.

20. An inkjet printer according to claim 19, further comprising:

velocity control means coupled to the carriage unit for causing the carriage unit to advance along a rectilinear path of travel at one of two different velocities during the formation of the individual ones of said plurality of swaths forming the copy of the scanned document image;

one of said velocities being a first high speed velocity for facilitating the printing an individual one of the swaths having a black ink droplet density exceeding a given threshold level in at least one region of said individual swath and a colorant ink droplet density not exceeding said given threshold level in all the remaining regions of said individual swath;

another one of said velocities being a second high speed velocity for facilitating the printing another individual one of the swaths having a colorant ink droplet density exceeding said given threshold level in at least one region of said another swath regardless of the black ink droplet density in said another swath.

* * * * *